United States Patent

Eom et al.

[11] Patent Number: 5,914,952
[45] Date of Patent: Jun. 22, 1999

[54] TRIBUTARY UNIT SIGNAL CROSS-CONNECTION APPARATUS

[75] Inventors: Doo Seop Eom; Sung Hyuk Choi; Sung Eun Jin; Je Soo Ko; Jong Hyun Lee, all of Daejeon, Rep. of Korea

[73] Assignees: Electronics and Telecommunications Research Institute, Daejeon; Korea Telecommunication Authority, Seoul, both of Rep. of Korea

[21] Appl. No.: 08/758,257

[22] Filed: Nov. 27, 1996

[30] Foreign Application Priority Data

Dec. 23, 1995 [KR] Rep. of Korea ............... 95-55891

[51] Int. Cl.[6] .................................................. H04L 12/50
[52] U.S. Cl. ................................... 370/369; 370/427
[58] Field of Search .................................. 370/369, 370, 370/360, 907, 372, 375, 377, 427, 371

[56] References Cited

U.S. PATENT DOCUMENTS 4,998,242  3/1991  Upp .
5,040,170  8/1991  Upp et al. .
5,570,358  10/1996  Alatalo et al. ............... 370/58.2
5,627,826  5/1997  Kameda et al. ............... 370/371

*Primary Examiner*—Chi H. Pham
*Assistant Examiner*—Kim T. Nguyen
*Attorney, Agent, or Firm*—Antonelli, Terry, Stout & Kraus, LLP

[57] ABSTRACT

A cross-connection apparatus for tributary unit-12 signal included in a synchronous transfer module-N signal used as a connection signal between synchronous digital hierarchy network nodes, is provided, including, an input/output and tributary unit time switching means for receiving a signal structured in the form of a frame (HEBUS) made up with an administration unit 3 signal, identifier byte and bit interleaved parity byte, performing an administration unit 3 pointer processing, virtual container 3 path overhead processing and tributary unit-12 pointer processing in order to be connected to the switching network, and thus performing a tributary unit-12 unit switching function; and a space switching means for receiving a frame (LBUS) made up with the tributary unit-12 signal, identifier byte and bit interleaved parity byte, namely, an LBUS signal, from the input/output and tributary unit time switching means, the means performing and outputting a space switching operation with the signal.

6 Claims, 8 Drawing Sheets

5,914,952

TRIBUTARY UNIT SIGNAL CROSS-CONNECTION APPARATUS

BACKGROUND OF THE INVENTION

1. Field of the Invention

The present invention relates to a cross-connection apparatus for a tributary unit (TU)-12 signal included in a synchronous transfer module (STM)-N signal which is used for a connection signal between the synchronous digital hierarchy (SDR) network nodes.

2. Discussion of Related Art

A section overhead (SOH) and a path overhead (POH) which are allocated for operation administration and maintenance (OA&M) of the transmission signal become useless after their processing. Therefore, the TU-12 signal can be allocated to the area where those overheads existed originally. If the TU-12 is used as a test access signal, the entire switch network can be tested during the service. Meanwhile, an identifier (ID) byte and bit interleaved parity (BIP) byte for inserting/detecting a predetermined pattern can be allocated to the newly produced signal frame for the purpose of usefully monitoring an error occurring between the boards of a system, and testing the system.

SUMMARY OF THE INVENTION

Accordingly, the present invention is directed to a tributary unit signal cross-connection apparatus that substantially obviates one or more of the problems due to limitations and disadvantages of the related art.

An object of the present invention is to provide a cross-connection apparatus for a tributary unit (TU)-12 signal included in a synchronous transfer module (STM)-N signal.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention as embodied and broadly described the cross-connection apparatus for tributary unit-12 signal included in a synchronous transfer module-N signal used as a connection signal between synchronous digital hierarchy network nodes of the present invention includes an input/output and tributary unit time switching means for receiving a signal structured in the form of a frame (HBUS) made up with an administration unit 3 signal, identifier byte and bit interleaved parity byte, performing an administration unit 3 pointer processing virtual container 3 path overhead processing and tributary unit-12 pointer processing in order to be connected to the switching network, and thus performing tributary unit-12 unit switching function; and a space switching means for receiving a frame (LBUS) made up with the tributary unit-12 signal, identifier byte and bit interleaved parity byte, namely, an LBUS signal, from the input/output and tributary unit time switching means, the means performing and outputting a space switching operation with the signal.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the drawings.

In the drawings

DETAILED DESCRIPTION OF PREFERRED EMBODIMENT

Reference will now be made in detail to the preferred embodiments of the present invention, examples of which are illustrated in the accompanying drawings.

Figure 1:
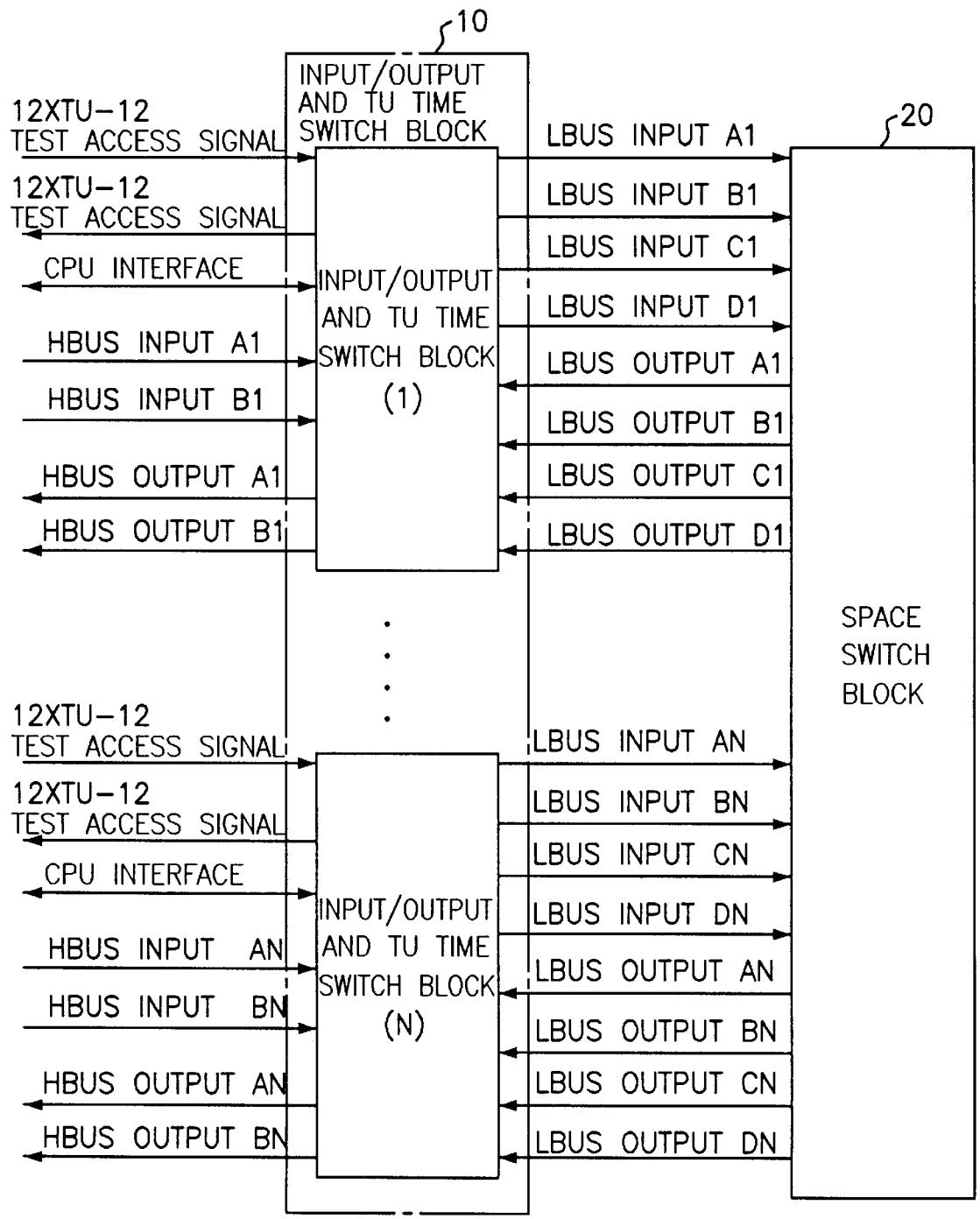
FIG. 1 is a block diagram of a tributary unit signal cross-connection apparatus of the present invention.
Figure 7:
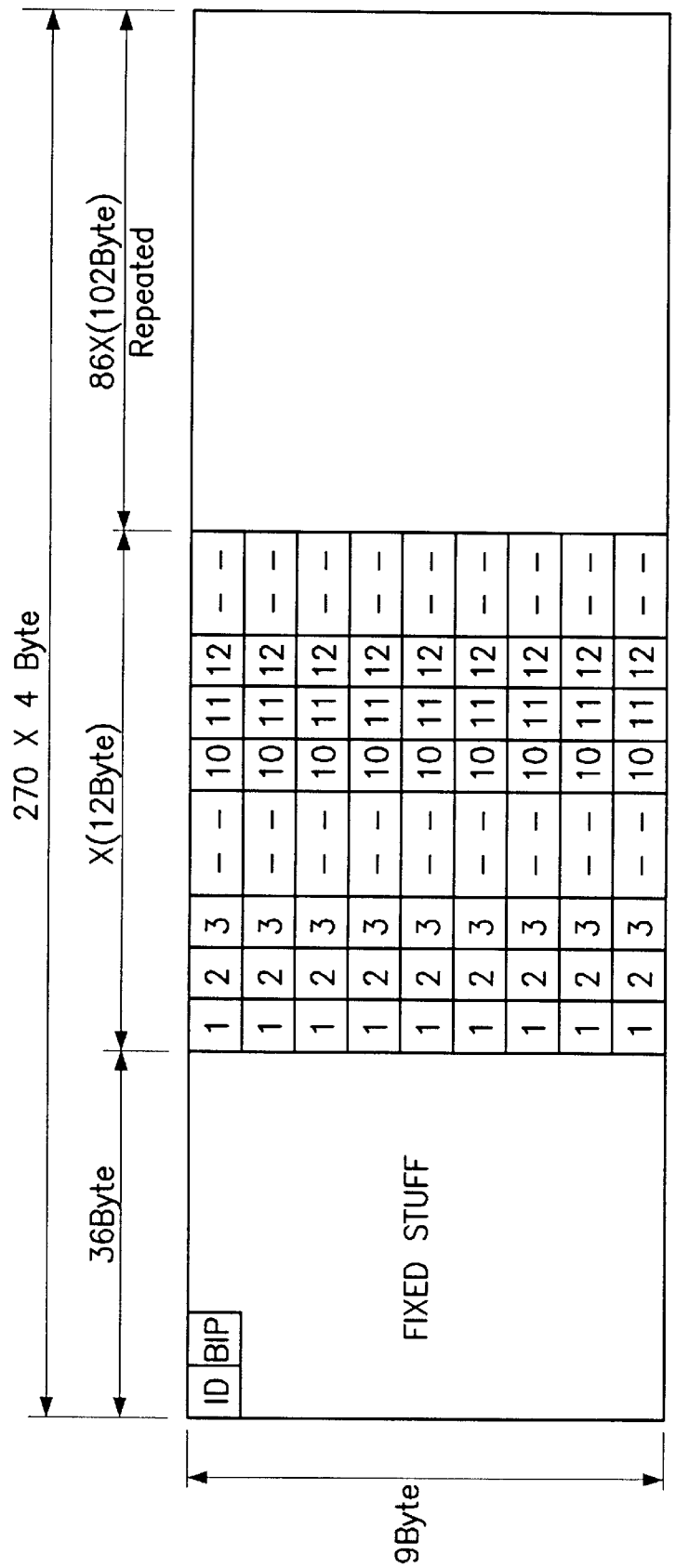
FIG. 7 illustrates an HBUS frame format of the invention.

As illustrated in FIG. 1 the present invention includes N input/output (I/O) and tributary unit (TU) time switch blocks 10 and a space switch block 20. The I/O and TU time switch blocks each input a signal in the form of a frame (HBUS, refer to FIG. 7) made up with 12 administration unit 3 (AU3) signals, identifier (ID) bytes and bit interleaved parity (BIP) byte, and thus perform the AU3 pointer processing function, virtual container 3 (VC3) path overhead (POH) processing function, and TU-12 pointer processing function, to thereby connect the signals to a switch network In addition, the I/O and TU time switch blocks have a TU-12 unit time switching function.

The space switch block 20 only performs the TU-12 space switch function.

Figure 8:
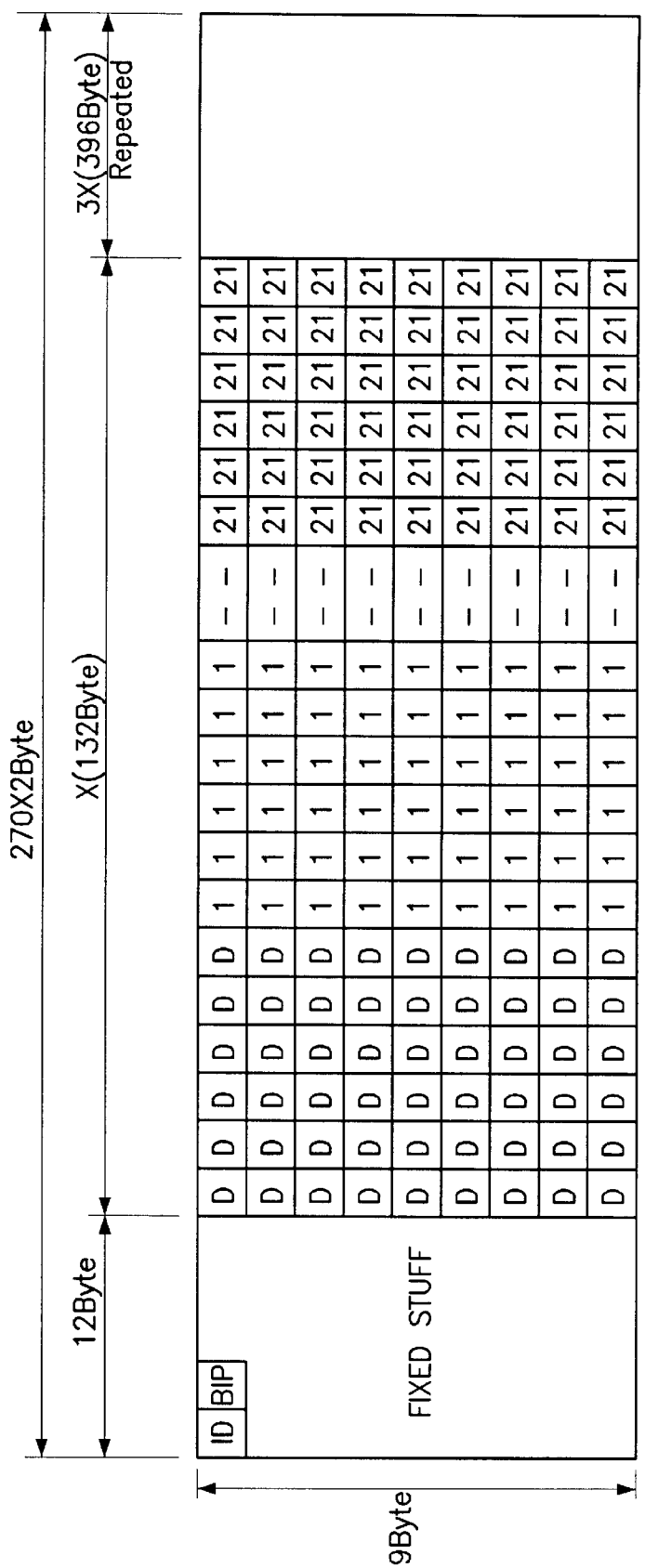
FIG. 8 illustrates an LBUS frame format of the invention

Those two blocks are connected in the form of a frame (LBUS, refer to FIG. 8) made up with 264 TU-12 signals, ID byte and BIP byte. The switch network is a three-stage (time-space-time) cross-network.

Figure 2:
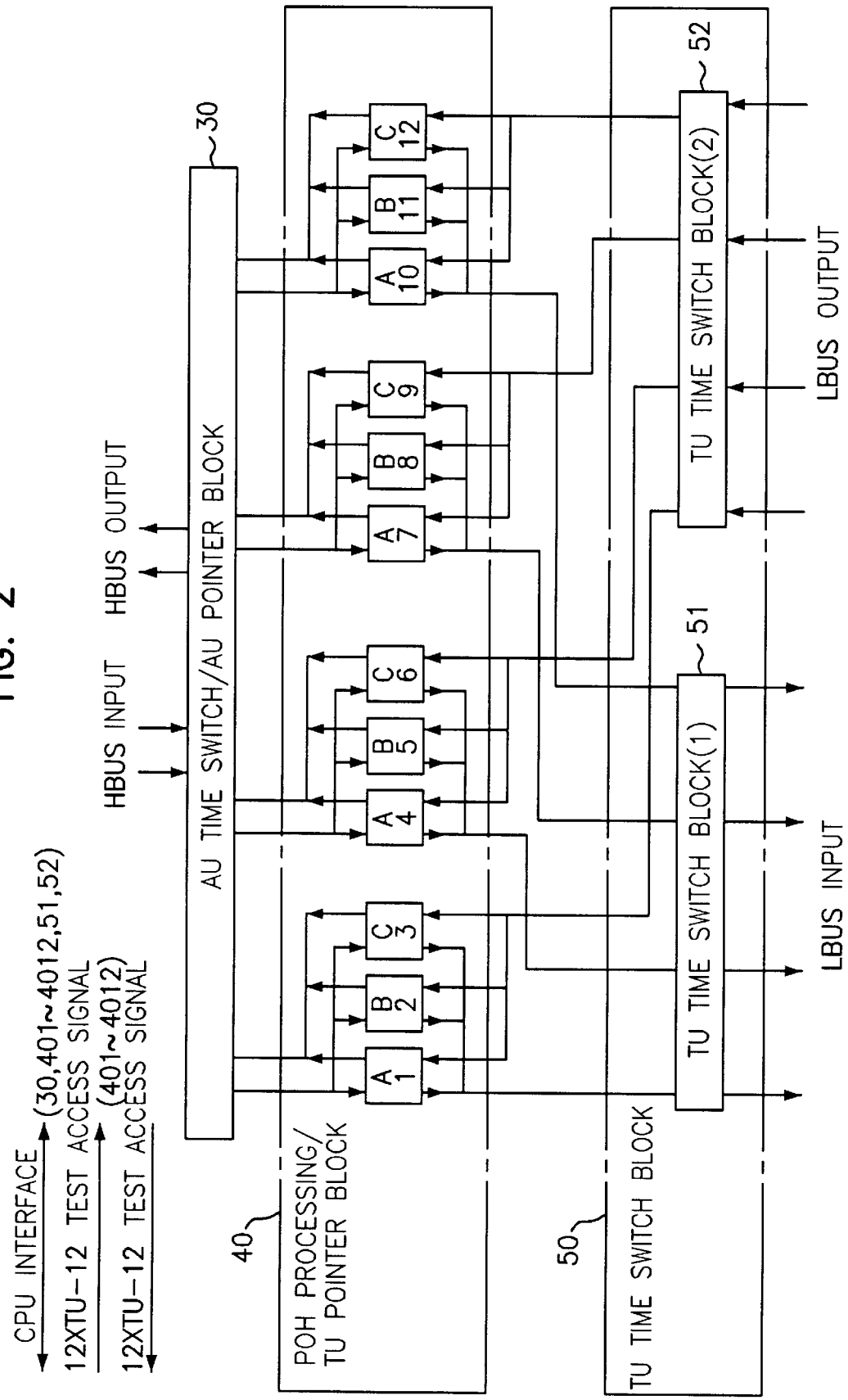
FIG. 2 is a block diagram of an input/output and tributary unit time switch blocks of the invention.

As illustrated in FIG. 2, the I/O and TU time switch block is made up with an AU time switch/AU pointer block 30, a POH processing/TU pointer block 40, and a TU time switch block 50. The AU time switch/AU pointer block 30 analyzes each pointer with respect to 12 AU3 channels which are switched through 24X12 AU3 switches by receiving two HBUSes, and extracts the starting point of the VC3 frame. A signal (8KHZ) indicative of the starting point of the extracted VC3 frame, a VC3 clock enabled signal (Gapped 6,264MHz) which is enabled only by the VC3 frame, and the VC3 data are output to the POH processing/TU pointer block 40. An interfacing operation between the POH processing/TU pointer block 40 is performed at 19,44M level. Accordingly, the 8 KHz signal indicative of VC3 frame's starting point is output respectively. However, the VC3 clock enabling signal and the VC3 data are output by being multiplexed by three. These four signals are output to the POH and TU pointer block 40.

In the opposite direction, the VC3 data of 19.44M level which are multiplexed with three VC3 signals output from the POH processing/TU pointer block 40, and the 8KHz signal indicative of the starting point of the data, are input to be reverse-multiplexed. And the pointer values are inserted respectively into the divided VC3 signals. Because four kinds of multiplexed VC3 data (19.44M level) are input, a total of twelve AU3 signals are formed. These signals are switched through the 12X24 AU3 switch, and then output to two HBUSes. The processing capacity of the AU time switch/AU pointer block 30 is an STM-4 level corresponding to twelve AU3 signal levels. The POH processing/TU pointer block 40 is made up with twelve similarity structured blocks, and each one has the processing capacity corresponding to one VC3 level. Each block has a high order path termination (HPT) function of inserting/ processing the VC3 POH, a high order path adaptation (HPA) function of processing the TU-12 pointer and thereby containing the VC-12 frame to the VC3 frame, a low order path overhead monitor (LPOM) function of monitoring the VC-12 POH, and a lower order path unequipped generator (LUG) function of displaying the unequipped state in the signal level bit of V5 bytes in case VC-12 does not exist.

Those twelve blocks connect with the AU time switch/AU pointer block in the form of groups made of three signals of A, B, C as illustrated in FIG. 2. These are four such groups are four. Each group connects to the AU time switch/AU pointer block in the same manner. When receiving data from the AU time switch/AU pointer block 30, a VC3 frame offset signal (8KHZ) indicating a starting point of the VC3 data should be given to each one of those three POH processing/ TU pointer blocks of A, B, C. However, in the present invention, the VC3 clock enable signal indicative of the VC3 data and their positions are input in the form of a multiplex with three kinds of data, so that the present invention minimizes the number of the signal lines required for the connection.

The three A, B, C POH processing/TU pointer blocks use their VC3 frame offset signals (8KHz) and multiplexed VC3 clock enable signals to reversely multiplex the multiplexed VC3 data, select one kind of VC3 data corresponding to themselves among those three kinds of VC3 data in order to extract the VC3 POH, and reversely multiplex the 21 TU-12 signals multiplexed in the VC3 frame in order to finally perform the pointer analyzing function with respect to each TU-12 signal. Thereafter, the function of monitoring the POH corresponding to the VC-12 signal, and the function of inserting the signal label with respect to the unequipped signal are performed. After these VC-12 signals are respectively recorded in the pointer buffer as a receiving clock, the TU-12 pointer value is reproduced by reading the VC-12 signals with a transmission clock, so that the TU-12 signal can be rearranged. The TU-12 pointer value with respect to one VC-12 signal input for a test access is reproduced. Thus, the VC-12 signal is rearranged in the same format as the twenty-one TU-12 signals multiplexed in the VC3 frame.

Figure 4:
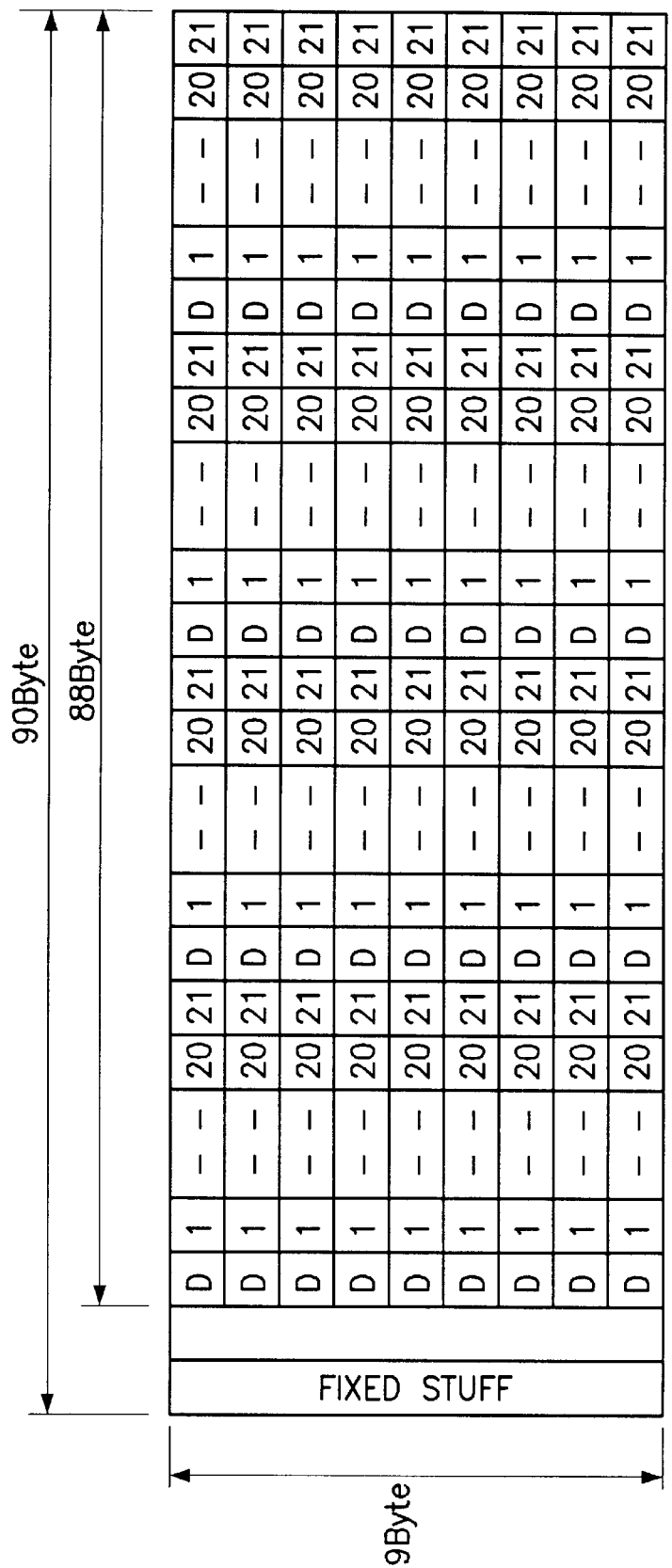
FIG. 4 illustrates a path overhead processing toward the tributary unit time switch block and the tributary unit point block output frame construction of the invention.

The construction of the frame, in which those twenty-two rearranged TU-12 signals are multiplexed, is illustrated in FIG. 4. Data output from one POH processing/TU pointer block are 6.48M level. The signals which are processed and output from three POH processing/TU pointer blocks of A, B, C are controlled in the board in a three stage manner of to thereby form the signals of multiplexed 19.44M level The form of the signals are illustrated in FIG. 5.

Figure 6:
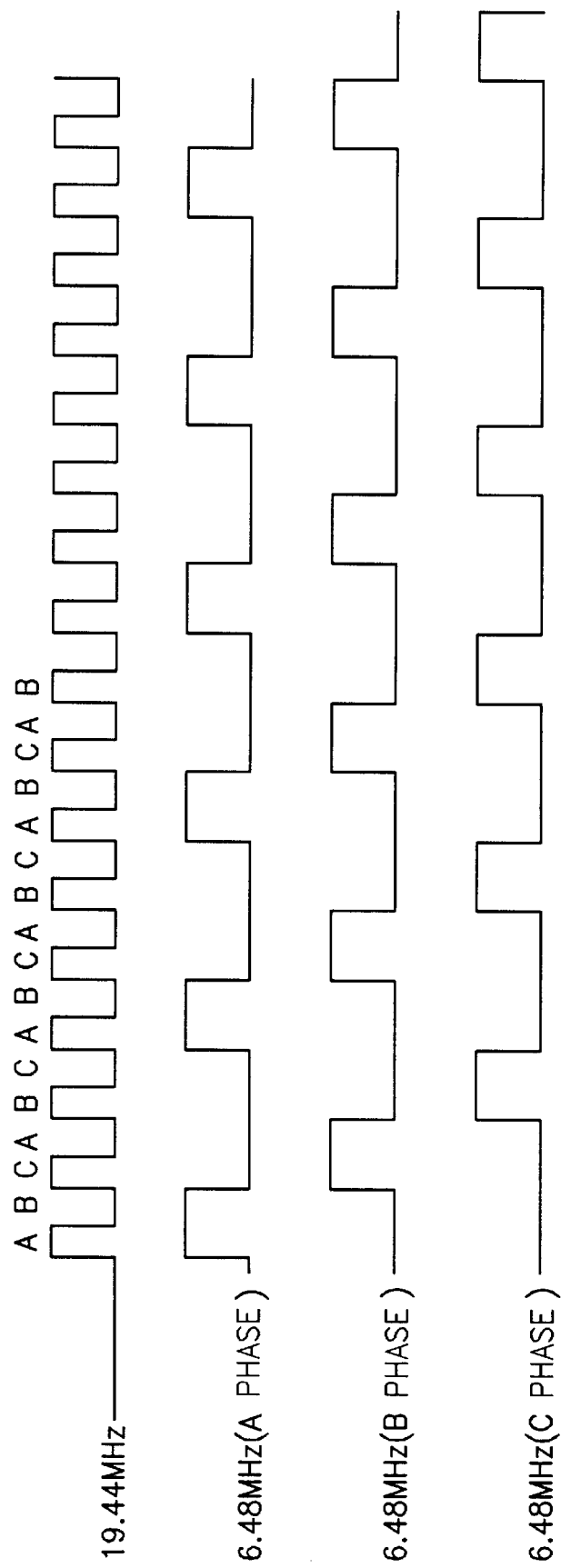
FIG. 6 is a timing diagram of signals which control three path overhead processing and tributary unit pointer block output multiplication according to the invention.

To multiplex the signal into a three-stage form in the board the, 19.44M clock is used as a system clock in the POH processing/TU pointer block. The signal shown in FIG. 6 is used as an enable signal so that the data should be output by three stages in case it is not the datas time slot. This signal is input to the front stage TU time switch 51. In this signal, 66 TU-12 signals including three test-accessing signals in total are multiplexed.

Figure 5:
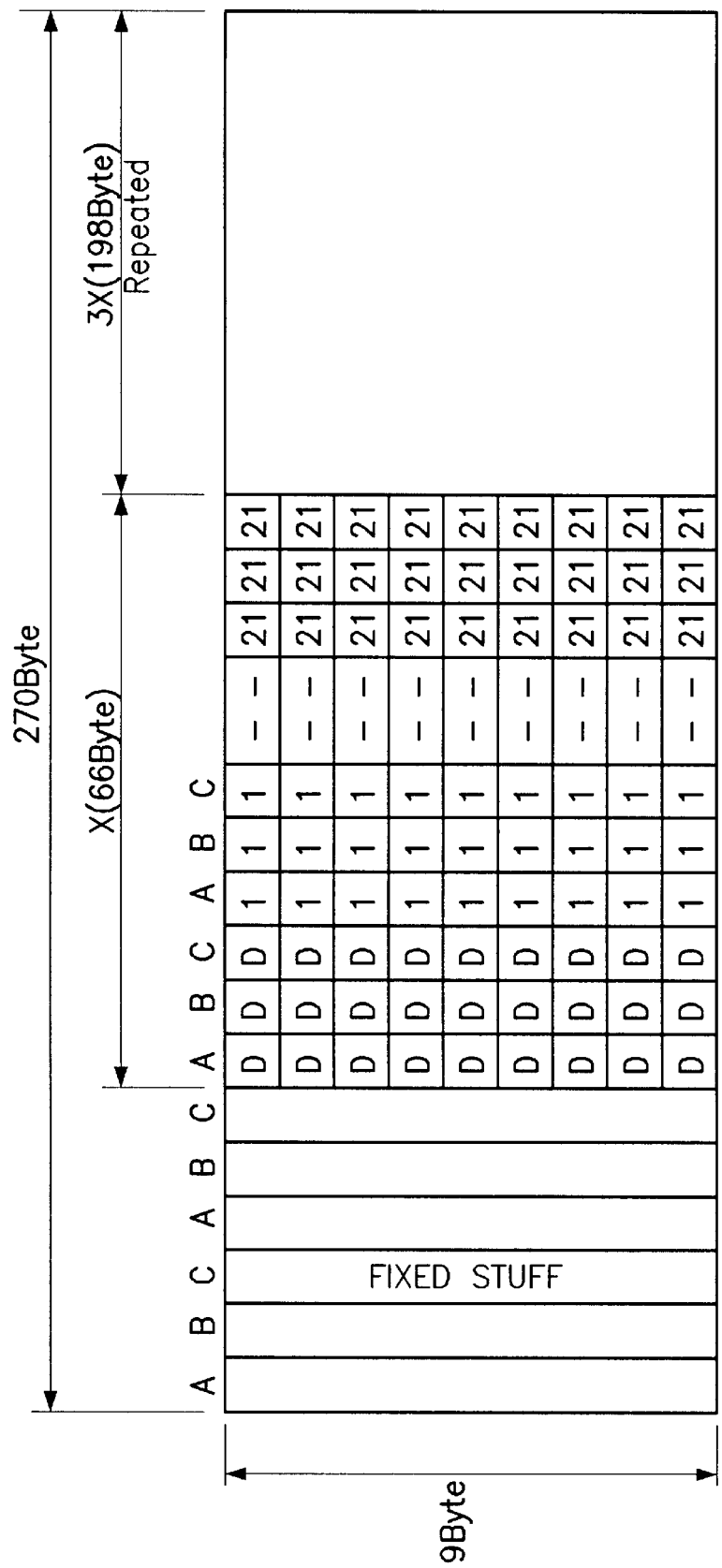
FIG. 5 illustrates a path overhead processing toward the tributary unit time switch block and a frame construction in which three tributary unit point blocks are multiplexed according to the invention.

Describing the state of the opposite direction, data is input from the back stage TU time switch block 52 in the same manner as in FIG. 5. That is, the forms of the POH processing/TU pointer block 40 data and the data transmitted between the front and back stage TU time switch blocks are the same. Here, the data output from the TU time switch block are not multiplexed in the boards, but output directly In the POH processing/TU pointer block multiplexed into A, B and C, the TU-12 data, which are multiplexed and input from the back stage TU time switch block, are multiplexed reversely, using the signal (8KHz) indicating the starting point of the frame in order to process the 6.48M level signal. After inserting VC3 POH into the twenty-one TU-12 signals excluding one test accessing TU-12 channel among those twenty-two multiplexed TU-12 signals, the TU-12 signals are output to the AU time switch/AU pointer block. Here, the outputs of three POH processing/TU pointer blocks which are formed in the group of A, B, C are controlled in three stages in the board, thereby forming the multiplexed 19.44M level signal. The same method of multiplexing the data in three stages is used for outputting the data from the POH processing/TU pointer block 40 to the back stage TU time switch block.

One test accessing TU-12 channel separated from the twenty-two multiplexed TU-12 input from the back stage TU time switch block 52, is output to an additional board for processing the test access. The TU time switch block 50 includes a front stage TU time switch block 51 and a back stage TU time switch block 52, and the processing capacity of each one is STM-4 level Both front-back stage TU time switch blocks 51 and 52 each are 528X528 TU-12 switches.

The signal connection between the front stage TU time switch block 51 and the POH processing/TU pointer block, and the signal connection between the back stage TU time switch block 52 and the POH processing/TU pointer block are the same as illustrated in FIG. 5.

The front stage time switch block 51 inputs four 19.44M data buses from the POH processing/TU pointer block, performs the 264×528 TU-12 switching operation, forms four LBUSes of 38.88M level, and thus outputs them to the space switch block 20. The back stage TU time switch 52 inputs four LBUSes from the space switch block 20, performs the 528×264 TU-12 switching operation, and outputs four data buses of 19.44M to the POH processing/TU pointer block 40.

Figure 3:
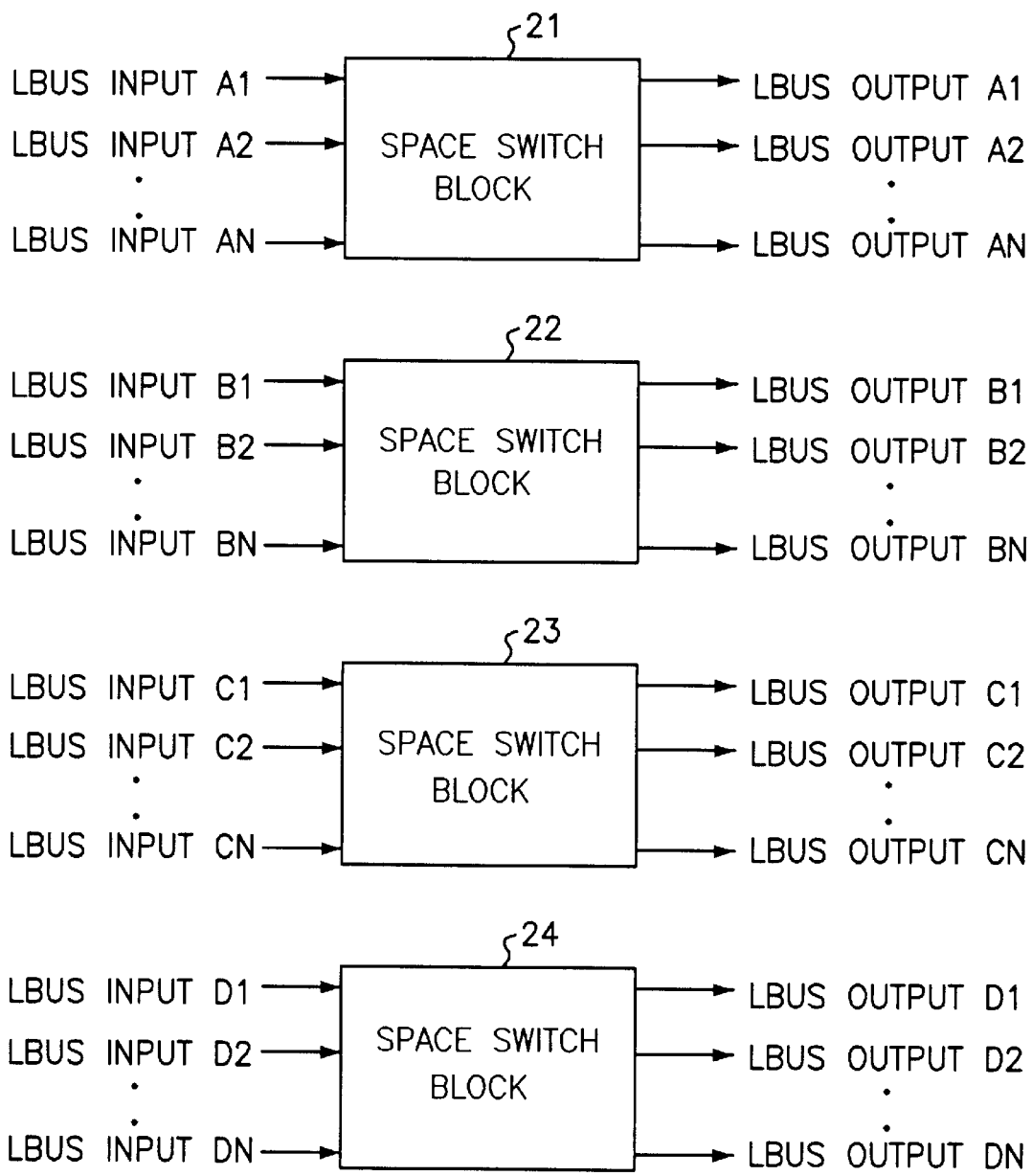
FIG. 3 is a block diagram of space switch blocks of the invention.

The space switch block illustrated in FIG. 3 includes four TU-12 space switches 21 through 24 for performing the TU-12 unit space switching operation. The four TU-12 space switches input an LBUS of 38.88Mb/s in which 264 TU-12 signals including 12 test accessing TU-12 channels are multiplexed at N input/output and TU time switch blocks 10 respectively to perform the nXn space switching between those n LBUSes, and output the LBUSes to the N input/ output and TU time switch blocks 10.

The ID byte for inserting/detecting the predetermined pattern is allocated to the first byte of LBUS. The part which outputs the LBUS inserts the predetermined value input from CPU into the LBUS frame. The area which inputs the LBUS extracts this from the frame and compares it with the inserted value to know if there is an error in the LBUS. Additionally, the LBUS connection test can be facilitated by monitoring this value through an oscilloscope when realizing hardware. BIP-8 code using an even parity is allocated to the second byte to monitor the error occurring in the LBUS. The same method as the B3 byte in the POH of VC3 frame are used for a calculation, but only the part of calculating the BIP-8 code is different. That is, the BIP-8 value with respect to the data excluding the FIXED STUFF is calculated. When the part which outputs the LBUS transmits the BIP-8 value, compares the BIP-8 value extracted from the input LBUS frame and the value re-calculated with respect to the LBUS to know if there is an error in the input LBUS frame. When there is no error, these two values are the same.

The effects of the invention is as follows:

(1) considering that these overheads are useless after the SOH and POH in the STM-N frame are processed, a new frame LBUS is made for allocating an additional TU-12 signal besides the TU-12 singal which is multiplexed in the STM-N frame. Therefore, it is possible to test-access the switch network through the additionally allocated TU-12 signal when all of the TU-12 signals in the STM-N signal are in service. Additionally, the clock of 77.76MHz forming the STM-4 frame divides by two is a 38.88MHz clock required for forming the LBUS frame, so that an additional phase locked loop (PLL) for clock combination is unnecessary.

(2) the present invention is usefully applied to monitor an error between the boards which form the system by allocating the ID byte and BIP byte for inserting/detecting a predetermined pattern to a newly made signal frame, and to test the system.

It will be apparent to those skilled in the art that various modifications and variations can be made in the tributary unit-12 signal cross-connection apparatus of the present invention without departing from the spirit or scope of the invention. Thus, it is intended that the present invention cover the modifications and variations of this invention provided they come within the scope of the appended claims and their equivalents.

What is claimed is:

1. A cross-connection apparatus for a tributary unit-12 signal included in a synchronous transfer module-N signal used as a connection signal between synchronous digital hierarchy network nodes, said apparatus comprising:

input/output and tributary unit time switching means for receiving a signal in the form of a frame (HBUS) having an administration unit 3 signal, an identifier byte and bit interleaved parity byte, performing an administration unit 3 pointer processing, virtual container 3 path overhead processing and tributary unit-12 pointer processing in order to be connected to said switching network, and thus performing a tributary unit-12 switching function; and space switching means for receiving a frame (LBUS) including the tributary unit-12 signal, identifier byte and bit interleaved parity byte, particularly an LBUS signal, from said input/output and tributary unit time switching means which performs a space switching operation with the tributary unit-12 signal.

2. The apparatus as claimed in claim 1, wherein said LBUS signal includes 264 tributary unit-12 signals including twelve test accessing tributary unit-12 channels, said identifier byte for inserting/detecting a predetermined pattern and said bit interleaved parity-8 byte using even parity for monitoring an error.

3. The apparatus as claimed in claim 1 wherein said identifier byte for inserting/detecting a predetermined pattern is structured, so that said LBUS-outputting side inserts a predetermined value inserted from CPU to said LBUS frame, and the LBUS-receiving side compares said inserted value with a value extracted from said frame to thereby determine if there is an error in said LBUS.

4. The apparatus as claimed in claim 1 wherein said input/output and tributary time switching means comprises administration unit time switching/administration unit pointer processing means having a administration unit 3 time switching function and administration unit 3 pointer processing function;

path overhead processing/tributary unit pointer processing means connected to said administration unit time switching and administration unit pointer processing means, and having a high order path termination function, a high order path adaptation function, a low order path overhead monitor function and a low order unequipped generator function; and tributary unit-12 time switching means connected to said path overhead processing/tributary unit pointer processing means.

5. The apparatus as claimed in claim 4, wherein said space switching means comprises four tributary unit-12 space switches for performing a space switching.

6. The apparatus as claimed in claim 5, wherein said four tributary unit-12 space switches each receive LBUS signals respectively from n input/output and tributary unit time switching means, perform an NXN space switching with respect to said n LBUS signals, and output said LBUS signals respectively to said n input/output and tributary unit time switching means.

* * * * *